United States Patent
Chien (10) Patent No.: US 9,524,252 B2
(45) Date of Patent: Dec. 20, 2016

(54) INPUT SYSTEM AND METHOD

(71) Applicant: Primax Electronics Ltd., Neihu, Taipei (TW)

(72) Inventor: Chih-Feng Chien, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 14/805,175

(22) Filed: Jul. 21, 2015

(65) Prior Publication Data

US 2016/0314084 A1 Oct. 27, 2016

(30) Foreign Application Priority Data

Apr. 24, 2015 (TW) .............................. 104113227 A (51) Int. Cl.
*G06F 13/14* (2006.01)
*G06F 13/10* (2006.01)
*G06F 13/42* (2006.01)
*G06F 3/00* (2006.01)

(52) U.S. Cl.
CPC ............. *G06F 13/102* (2013.01); *G06F 13/42* (2013.01)

(58) Field of Classification Search
CPC ............. G06F 13/14; G06F 13/38; G06F 3/00
USPC ............................................. 710/305, 8, 62
See application file for complete search history.

(56) References Cited

U.S. PATENT DOCUMENTS

| | | | | | |
|---|---|---|---|---|---|
| 2005/0241467 | A1* | 11/2005 | Lo | ........................ | G10H 1/344 84/744 |
| 2006/0085584 | A1* | 4/2006 | Chen | .................... | G06F 1/1632 710/303 |
| 2009/0117777 | A1* | 5/2009 | Chen | ....................... | G06F 3/023 439/502 |
| 2010/0180063 | A1* | 7/2010 | Ananny | .............. | H04M 1/6066 710/315 |
| 2012/0083208 | A1* | 4/2012 | Giles | ..................... | G06F 13/387 455/41.2 |
| 2012/0266079 | A1* | 10/2012 | Lee | ................... | G06F 17/30283 715/744 |
| 2013/0018975 | A1* | 1/2013 | Higgins | ............... | H04W 12/02 709/208 |
| 2013/0232282 | A1* | 9/2013 | Kim | .................. | H04M 1/72533 710/21 |
| 2013/0282932 | A1* | 10/2013 | Robert | ................ | G06F 11/3051 710/17 |

(Continued)

*Primary Examiner* — Christopher Shin
(74) *Attorney, Agent, or Firm* — Kirton McConkie; Evan R. Witt (57) ABSTRACT

An input system includes a communication device and a first input device. The communication device includes a communication chip and a communication port. The first input device includes a signal port connectable with the communication port and a device connecting port connectable with a second input device. In an input method, the communication device transmits a first pairing signal to the first input device so as to acquire a first identification code and a connection information of the first input device, and then the communication device transmits a first inquiring signal containing the first identification code to the first input device so as to acquire a first input signal from the first input device. If a second pairing signal and a second inquiring signal are transmitted to the second input device, the communication device acquires a second input signal from the second input device.

18 Claims, 6 Drawing Sheets

(56) References Cited

U.S. PATENT DOCUMENTS

| | | | |
|---|---|---|---|
| 2013/0324035 A1* | 12/2013 | Strommen | G06F 3/01 455/41.1 |
| 2013/0326104 A1* | 12/2013 | Strommen | G06F 1/1632 710/304 |
| 2014/0011446 A1* | 1/2014 | Kangas | H04B 5/0031 455/41.1 |
| 2015/0350185 A1* | 12/2015 | Cairns | H04L 12/2816 726/7 |
| 2016/0062923 A1* | 3/2016 | Holzbecher | G06F 13/105 710/63 |

* cited by examiner

INPUT SYSTEM AND METHOD

FIELD OF THE INVENTION

The present invention relates to an input system and an input method, and more particularly to an input system and an input method for communicating with an electronic device.

BACKGROUND OF THE INVENTION

Generally, keyboards, touchpads, mice and other input devices have built-in irreplaceable wired communication chips (e.g., USB communication chips) or wireless communication chips (e.g., Bluetooth communication chips). Moreover, since these input devices cannot be connected with other external devices, the functions are not expandable. In other words, the conventional input devices are not user-friendly. For example, if a user intends to use both of a wired keyboard and a wireless keyboard, the user has to purchase two keyboards that have different communication chips but have the same function. Moreover, after the user purchases the keyboards, the original functions of the keyboards cannot be expanded through other externals devices. Instead, for expanding the functions, the user has to purchase other devices and connect these devices with an electronic device. However, the above approaches increase the additional cost, and it is difficult to carry and store these devices.

Figure 1:
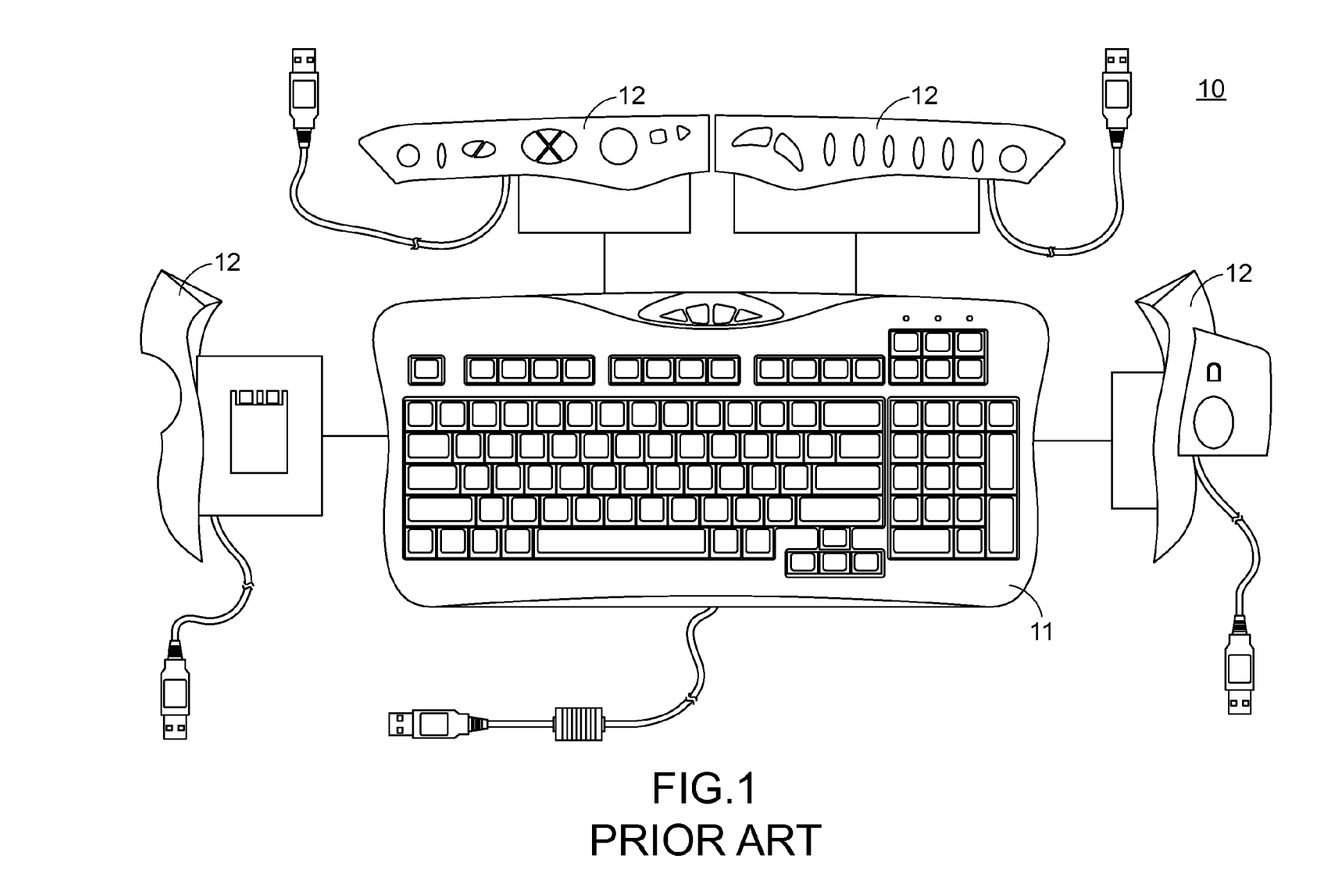
FIG. 1 is a schematic exploded view illustrating a conventional function-expandable input system and taken along a front viewpoint.
Figure 2:
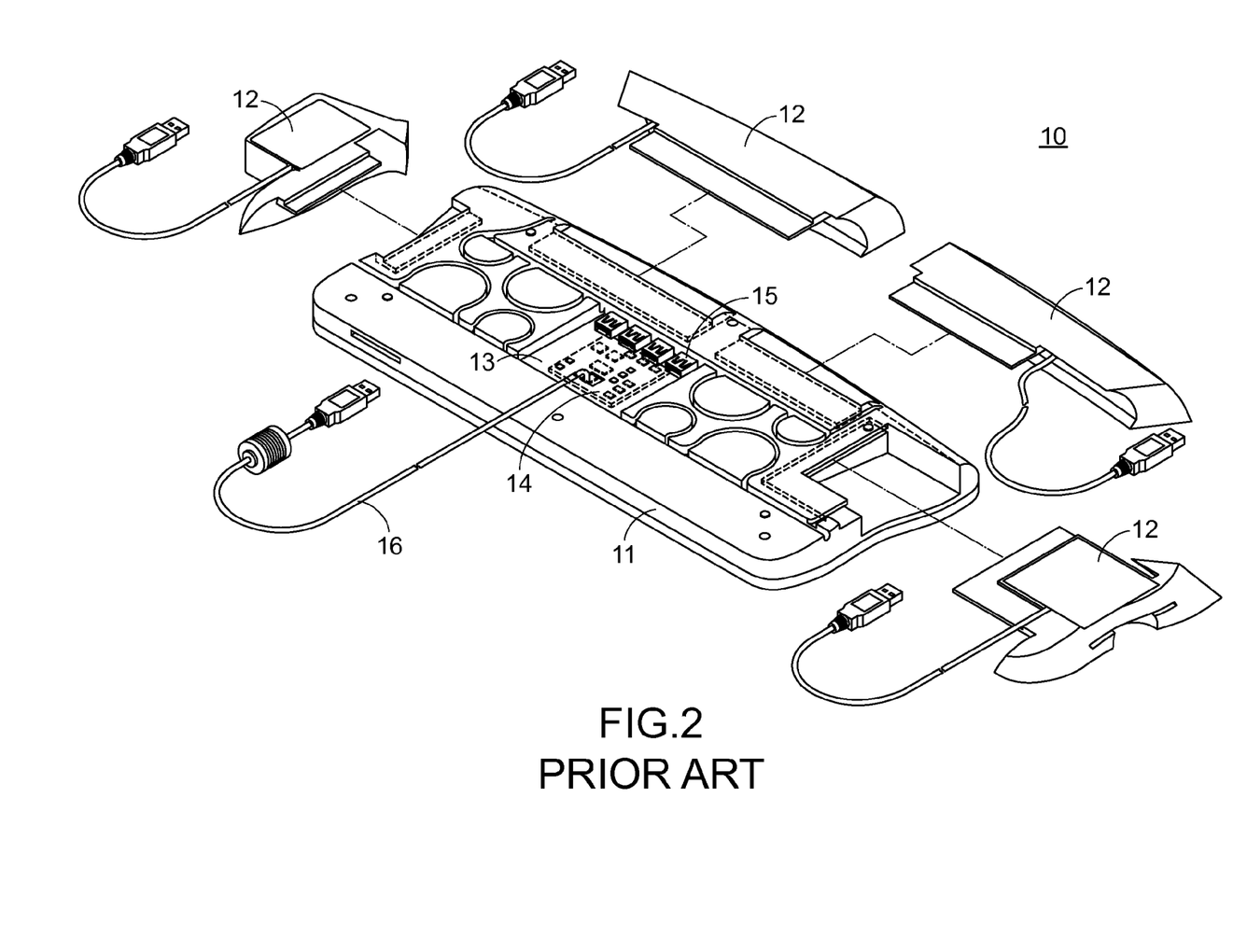
FIG. 2 is a schematic exploded view illustrating the conventional function-expandable input system of FIG. 1 and taken along a rear viewpoint.

For solving the above drawbacks, an input system capable of connecting to other external devices to expand the functions has been introduced into the market. FIG. 1 is a schematic exploded view illustrating a conventional function-expandable input system and taken along a front viewpoint. FIG. 2 is a schematic exploded view illustrating the conventional function-expandable input system of FIG. 1 and taken along a rear viewpoint. This input system is disclosed in U.S. Pat. No. 6,504,709 for example. As shown in FIGS. 1 and 2, the conventional input system 10 comprises a keyboard 11 and four external devices 12. An accommodation space 13 is formed in a rear side of the keyboard 11. A circuit board 14 is disposed within the accommodation space 13. The four external devices 12 are connected with four connecting ports 15, respectively. The four external devices 12 and a connecting wire 16 are electrically connected with the circuit board 14. The connecting wire 16 is connected with an electronic device (not shown). Consequently, the keyboard 11 and the four external devices 12 are in communication with the electronic device in order to input characters or implement associated tasks and expand the functions.

As mentioned above, the conventional input system 10 is connected with the electronic device through the connecting wire 16 only. That is, the user cannot replace the communication chip to change the way of connecting the input system 10 and the electronic device according to the practical requirements. Moreover, the user cannot use the external device 12 individually or expand the functions thereof. Even if the user only intends to use the external device 12, the external device 12 still needs to be connected with the keyboard 11 before use. In other words, the conventional input system 10 cannot solve the above drawbacks (e.g., the additional cost and the carrying and storing difficulty).

Therefore, there is a need of providing an improved input system in order to overcome the above drawbacks.

SUMMARY OF THE INVENTION

An object of the present invention provides an input system and an input method capable of integrating a communication device with one or more input devices according to the practical requirements.

In accordance with an aspect of the present invention, there is provided an input system. The input system includes a communication device and a first input device. The communication device is in communication with an electronic device. The communication device includes a communication chip and a communication port. The first input device generates a first input signal. The first input device includes a signal port and at least one device connecting port. The signal port is connectable with the communication port. The at least one device connecting port is connectable with at least one second input device. The second input device generates a second input signal. When the signal port is connected with the communication port, the communication device transmits a first pairing signal to the first input device so as to acquire a first identification code of the first input device and a connection information of the first input device. After the communication device transmits a first inquiring signal containing the first identification code to the first input device, the communication device acquires the first input signal from the first input device. The communication device judges whether a second pairing signal has to be transmitted to the second input device according to the connection information. If the second pairing signal is transmitted to the second input device, the communication device acquires a second identification code of the second input device.

In accordance with another aspect of the present invention, there is provided an input method. The input method includes the following steps. Firstly, a communication device transmits a first pairing signal to a first input device so as to acquire a first identification code of the first input device and a connection information of the first input device. Then, the communication device judges whether the first input device is connected with at least one second input device according to the connection message. If the first input device is connected with the corresponding second input device, the communication device transmits a second pairing signal to the corresponding second input device to acquire a second identification code of the corresponding second input device. If the first input device is not connected with the at least one second input device, the communication device transmits a first inquiring signal containing the first identification code to the first input device so as to acquire a first input signal of the first input device.

The above objects and advantages of the present invention will become more readily apparent to those ordinarily skilled in the art after reviewing the following detailed description and accompanying drawings, in which:

DETAILED DESCRIPTION OF THE
PREFERRED EMBODIMENT

Figure 3:
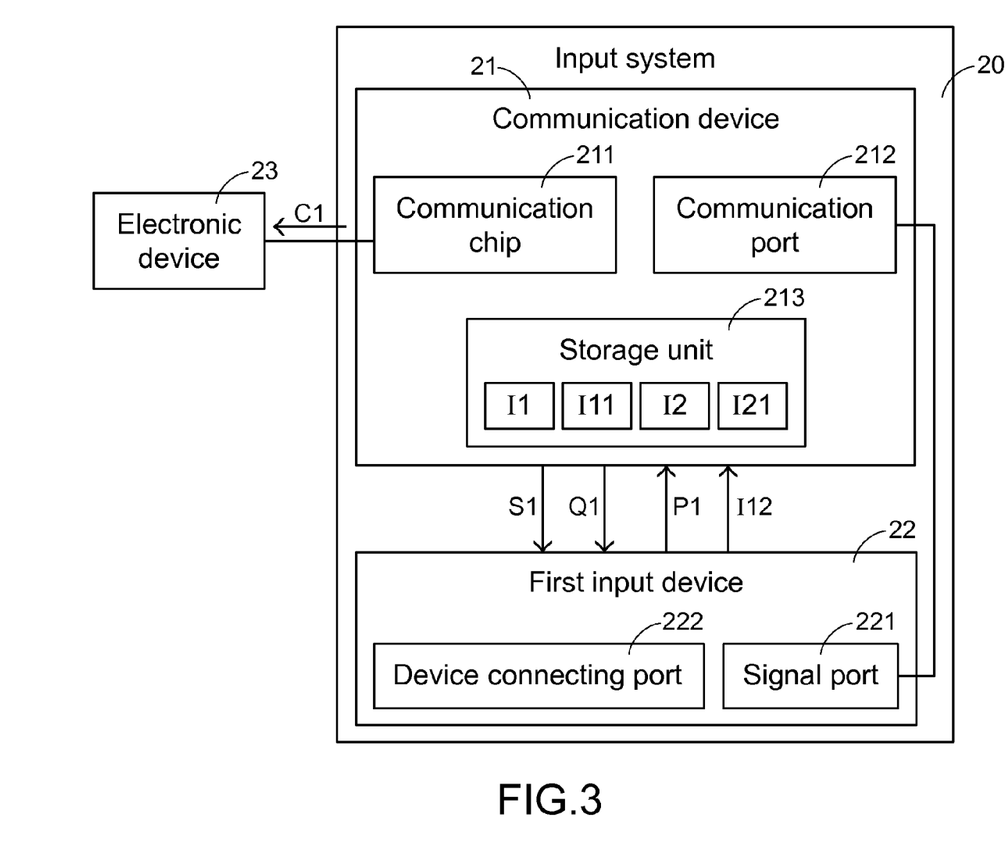
FIG. 3 is a schematic functional block diagram of an input system according to a first embodiment of the present invention.
Figure 4:
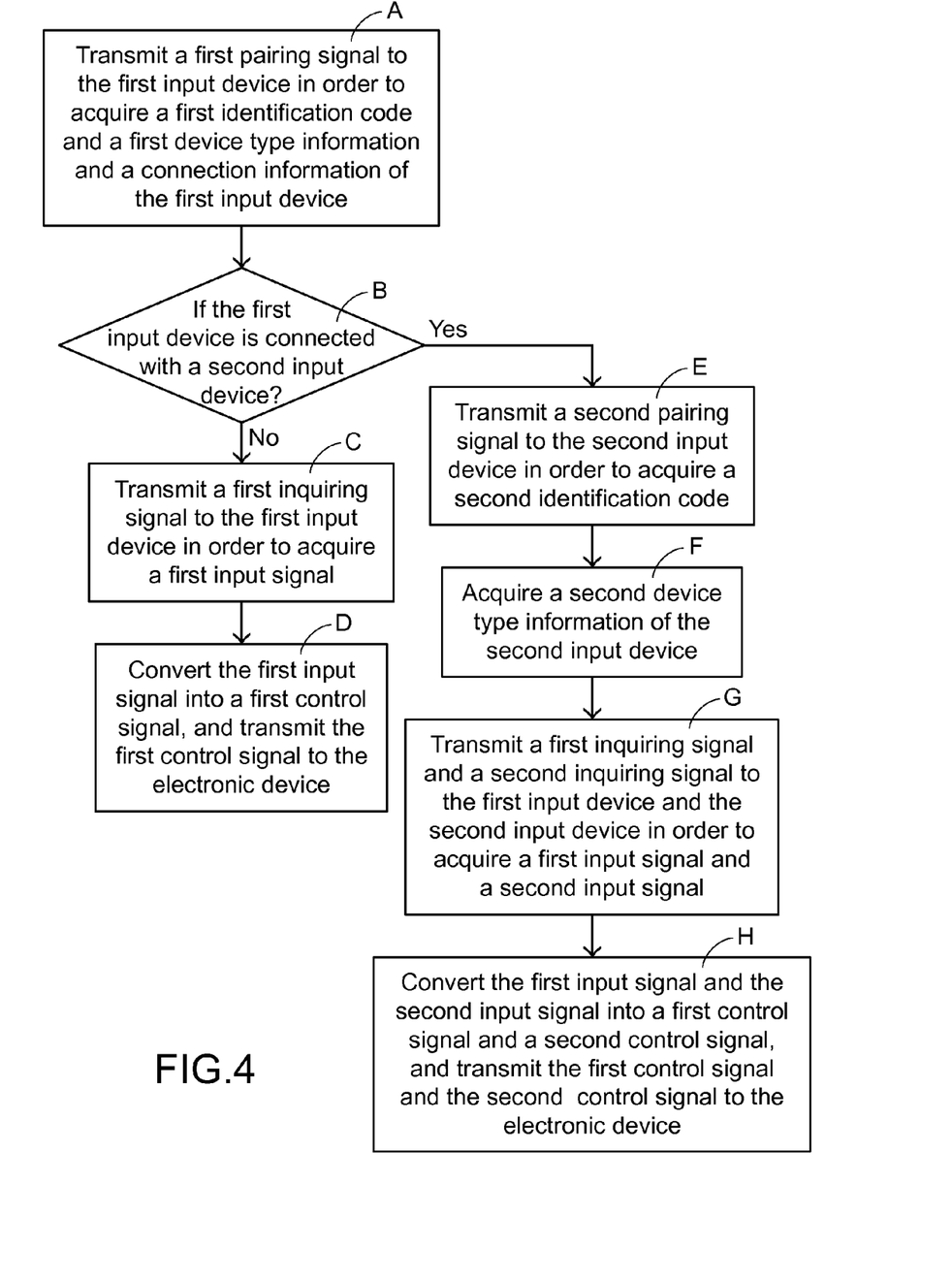
FIG. 4 is a flowchart illustrating an input method according to an embodiment of the present invention.

The present invention provides an input system and an input method. The present invention will now be described more specifically with reference to the following embodiments. Please refer to FIGS. 3 and 4. FIG. 3 is a schematic functional block diagram of an input system according to a first embodiment of the present invention. FIG. 4 is a flowchart illustrating an input method according to an embodiment of the present invention.

First of all, the components of the input system of this embodiment will be illustrated as follows. The input system 20 comprises a communication device 21 and a first input device 22. The communication device 21 comprises a communication chip 211 and a communication port 212. The first input device 22 comprises a signal port 221 and a device connecting port 222. In this embodiment, the communication chip 211 is a wired communication chip or a wireless communication chip. For example, the wired communication chip is a universal serial bus (USB), and the wireless communication chip is a 2.4GHz wireless communication chip or a Bluetooth wireless communication chip. The communication port 212, the signal port 221 and the device connecting port 222 are connecting ports that comply with I2C (Inter-Integrated Circuit) or SPI (Serial Peripheral Interface Bus) interface standards.

A process of assembling the input system of this embodiment will be illustrated as follows. Firstly, as shown in FIG. 3, the signal port 221 is connected with the communication port 212. Consequently, the first input device 22 is in communication with the electronic device 23 through the communication device 21. The device connecting port 222 can be connected with another input device. In this embodiment, the device connecting port 222 is not connected with any input device.

Please refer to the flowchart of FIG. 4. In a step A, the signal port 221 of the first input device 22 is connected with the communication port 212 of the communication device 21. Consequently, a first pairing signal S1 is transmitted from the communication device 21 to the first input device 22 through the communication port 212 and the signal port 221. The first pairing signal S1 contains a command of requesting the first input device 22 to provide a first identification code I1 thereof. After the first pairing signal S1 is received by the first input device 22, the first identification code I1 is transmitted from the first input device 22 to the communication device 21 through the signal port 221 and the communication port 212. The first identification code I1 is an ID identification code that is built in the first input device 22 before the first input device 22 leaves the factory.

Moreover, the communication device 21 further comprises a storage unit 213. The identification codes of the all input devices compatible with the communication device 21 and the device types corresponding to these identification codes have been previously stored in the storage unit 213. In other words, the first identification code I1 and a first device type information I11 corresponding to the first identification code I1 have been previously stored in the storage unit 213. Consequently, after the first identification code I1 is received by the communication device 21, the communication device 21 can judge the device type of the first input device 22 that is connected with the communication device 21. An example of the device type of the first input device 22 includes but is not limited to a keyboard, a touchpad, a mouse or a game controller.

Moreover, the first pairing signal Si further contains a command of requesting the first input device 22 to provide a connection information I12 thereof. The connection information I12 contains the message about the number of input devices connected to the first input device 22. Then, in a step B of FIG. 4, the communication device 21 judges whether the first input device 22 is connected with another input device according to the connection information I12.

In this embodiment, the first input device 22 is not connected with any other input device. Consequently, after the communication device 21 is in communication with the electronic device in a wired transmission manner or a wireless transmission manner, the communication device 21 periodically performs a step C of FIG. 4. In the step C, a first inquiring signal Q1 containing the first identification code I1 is transmitted from the communication device 21 to the first input device 22.

For example, the user is operating the first input device 22. After the first inquiring signal Q1 is received by the first input device 22, a first input signal P1 in response to the user's operation is transmitted to the communication device 21 through the signal port 221 and the communication port 212. As mentioned above, the first device type information I11 of the first input device 22 has been acquired by the communication device 21. Consequently, after the first input signal P1 is received by the communication device 21, the first input signal P1 is converted into a first control signal C1 that complies with the first device type information I11, and the first control signal C1 is transmitted from the communication device 21 to the electronic device 23 to control the electronic device 23 (i.e., in a step D of FIG. 4).

In an embodiment, the first input device 22 is a numeric keyboard. If the first input signal P1 contains the digits 1 and 2, the first control signal generated by the first control signal C1 contains a command of inputting the digit 1 and the digit 2. In another embodiment, the first input device 22 is a touchpad. If the first input signal P1 contains the digits 1 and 2, the first control signal generated by the first control signal C1 contains a command about the coordinate position including the X-axis coordinate 1 and the Y-axis coordinate 2.

Figure 5:
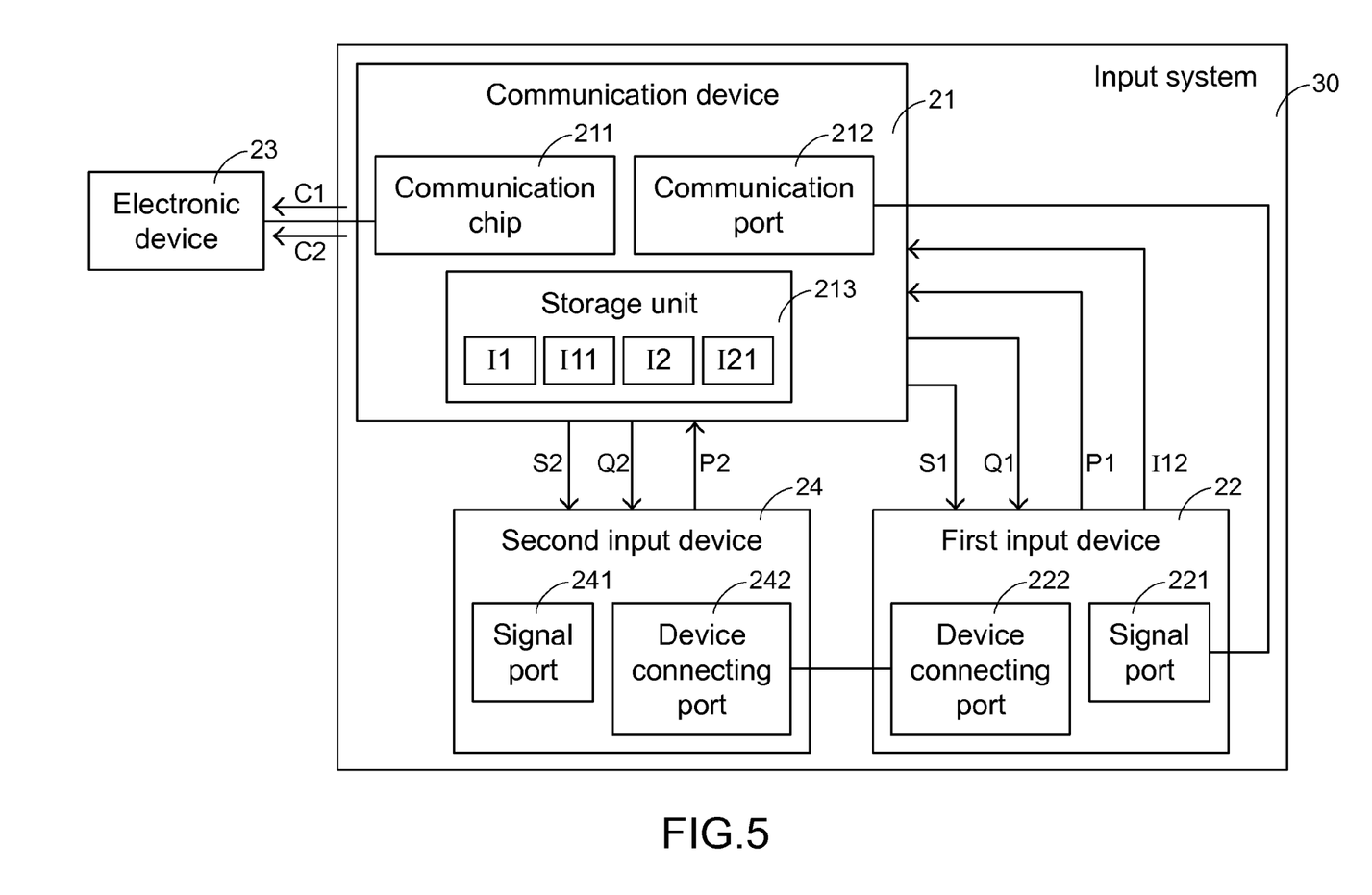
FIG. 5 is a schematic functional block diagram of an input system according to a second embodiment of the present invention.

In case that the device connecting port 222 of the first input device 22 is connected with another input device, the input method of the input system 30 will be illustrated as follows. Please refer to FIGS. 4 and 5. FIG. 4 is the flowchart illustrating the input method according to an embodiment of the present invention. FIG. 5 is a schematic functional block diagram of an input system according to a second embodiment of the present invention.

In comparison with the first embodiment, the input system 30 further comprises a second input device 24. The second input device 24 is connected with the device connecting port 222 of the first input device 22. The second input device 24 comprises a signal port 241 and a device connecting port 242. In case that the signal port 241 is connected with the communication port 212 of the communication device 21, the second input device 24 is in communication with the electronic device 23 through the communication device 21. The device connecting port 242 of the second input device 24 is connected with the device connecting port 222 of the first input device 22.

Especially, if the signal port 241 of the second input device 24 is connected with the communication port 212 of the communication device 21, the second input device 24 is considered as the first input device 22. Under this circumstance, the input method of the second input device 24 is identical to that of the first embodiment. In this embodiment, the signal port 241 of the second input device 24 is not connected with the communication port 212 of the communication device 21. The input method of this embodiment will be illustrated as follows.

As mentioned above, in the step B of FIG. 4, the connection information I12 containing the number of input devices connected to the first input device 22 is transmitted from the first input device 22 to the communication device 21. The communication device 21 judges whether the first input device 22 is connected with another input device according to the connection information I12. In this embodiment, the first input device 22 is connected with the second input device 24. Consequently, after the connection information I12 is received by the communication device 21, a step E is performed. In the step E, a second pairing signal S2 is transmitted from the communication device 21 to the second input device 24 through the communication port 212, the signal port 221, the device connecting port 222 and the device connecting port 242.

As mentioned above, the first identification code I1 and the first device type information I11 corresponding to the first identification code I1 have been previously stored in the storage unit 213 of the communication device 21. In addition, a second identification code I2 and a second device type information I21 corresponding to the second identification code I2 have been previously stored in the storage unit 213 of the communication device 21. Consequently, in the step E of FIG. 4, the second pairing signal S2 further contains a command of inquiring whether the second input device 24 complies with the second identification code I2. If the second input device 24 complies with the second identification code I2, the communication device 21 can judge the device type of the second input device 24 (i.e., the step F of FIG. 4). An example of the device type of the second input device 24 includes but is not limited to a keyboard, a touchpad, a mouse or a game controller. Moreover, the device type of the second input device 24 and the device type of the first input device 22 may be identical or different.

Then, the communication device 21 periodically performs a step G of FIG. 4. In the step G, a first inquiring signal Q1 containing the first identification code I1 is transmitted from the communication device 21 to the first input device 22, and a second inquiring signal Q2 containing the second identification code I2 is transmitted from the communication device 21 to the second input device 24.

If the user is operating the first input device 22, after the first inquiring signal Q1 is received by the first input device 22, a first input signal P1 in response to the user's operation is transmitted to the communication device 21 through the signal port 221 and the communication port 212. Whereas, if the user is operating the second input device 24, after the second inquiring signal Q2 is received by the second input device 24, a second input signal P2 in response to the user's operation is transmitted to the communication device 21 through the device connecting port 242, the device connecting port 222, the signal port 221 and the communication port 212 (i.e., the step G of FIG. 4).

As mentioned above, the first device type information I11 of the first input device 22 and the second device type information I21 of the second input device 24 have been acquired by the communication device 21. Consequently, after the first input signal P1 and the second input signal P2 are received by the communication device 21, the first input signal P1 and the second input signal P2 are converted into a first control signal C1 complying with the first device type information I11 and a second control signal C2 complying with the second device type information I21, and the first control signal C1 and the second control signal C2 are transmitted to the electronic device 23 to control the electronic device 23 (i.e., in a step H of FIG. 4).

In some other embodiments, the communication device 21 comprises plural communication ports 212 so as be connected with plural first input devices 22. In some other embodiments, the first input device 22 comprises plural device connecting ports 222 to be connected with plural second input devices 24. When the communication device 21 is connected with the plural first input devices 22 or when the first input device 22 is connected with the plural second input devices 24, the device types of the plural first input devices 22 or the device types of the plural second input devices 24 may be identical or different. The method of connecting the communication device 21 with the plural first input devices 22 or the method of connecting the plural first input devices 22 with the plural second input devices 24 is similar to the above connecting method, and is not redundantly described herein.

Figure 6:
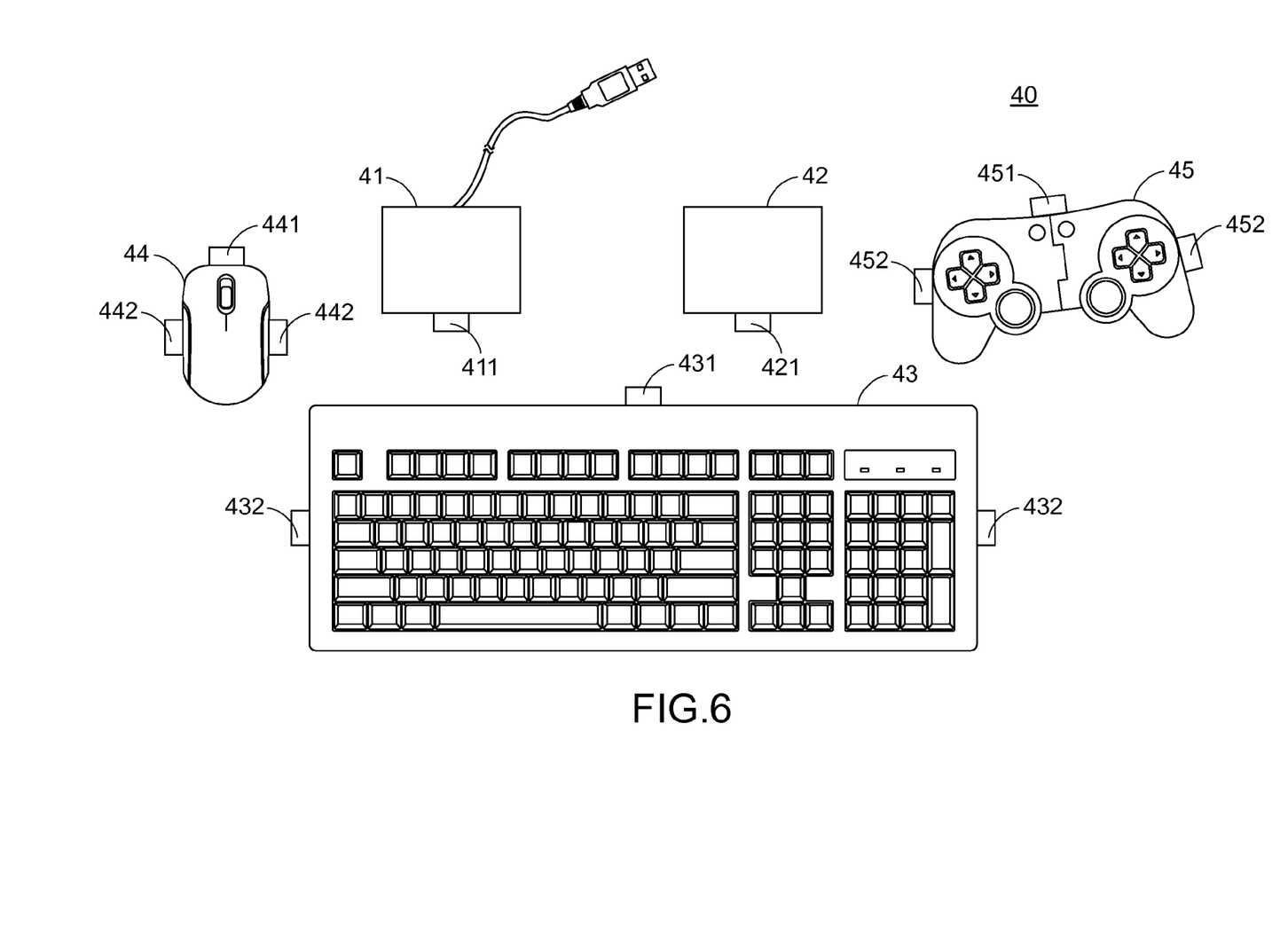
FIG. 6 schematically illustrates an input system according to a third embodiment of the present invention.

Hereinafter, an implementation example of the input system of the present invention will be illustrated with reference to FIG. 6. FIG. 6 schematically illustrates an input system according to a third embodiment of the present invention. As shown in FIG. 6, the input system 40 comprises a USB connecting device 41, a Bluetooth connecting device 42, a keyboard 43, a mouse 44 and a game controller 45. In this embodiment, the USB connecting device 41 and the Bluetooth connecting device 42 are examples of the above communication devices. The keyboard 43, the mouse 44 and the game controller 45 are examples of the first input device or the second input device.

The USB connecting device 41 comprises a communication port 411, and the Bluetooth connecting device 42 comprises a communication port 421. The keyboard 43 comprises a signal port 431 and two device connecting ports 432. The mouse 44 comprises a signal port 441 and two device connecting ports 442. The game controller 45 comprises a signal port 451 and two device connecting ports 452.

In case that the communication port 411 of the USB connecting device 41 is connected with the signal port 431 of the keyboard 43, the signal port 441 of the mouse 44 or the signal port 451 of the game controller 45, the keyboard 43, the mouse 44 or the game controller 45 is the wired input device that is communication with the electronic device in a wired transmission manner.

In case that the communication port 421 of the Bluetooth connecting device 42 is connected with the signal port 431 of the keyboard 43, the signal port 441 of the mouse 44 or the signal port 451 of the game controller 45, the keyboard 43, the mouse 44 or the game controller 45 is the wireless input device that is communication with the electronic device in a wireless transmission manner.

Moreover, according to the practical requirements, the keyboard 43, the mouse 44 and the game controller 45 can be integrated with each other through the device connecting ports 432, 442 and 452.

For example, in an embodiment, the two device connecting ports 432 of the keyboard 43 are respectively connected with the device connecting port 442 of the mouse 44 and the device connecting port 452 of the game controller 45, and the signal port 431 of the keyboard 43 is connected with the communication port 411 of the USB connecting device 41. Under this circumstance, the keyboard 43 is a wired input device, and the mouse 44 and the game controller 45 are in communication with the USB connecting device 41 through the keyboard 43 so as to exchange signals.

Moreover, the identification codes of the keyboard 43, the mouse 44 and the game controller 45 have been previously stored in the USB connecting device 41. Consequently, when the USB connecting device 41 is connected with the keyboard 43, the USB connecting device 41 transmits a first pairing signal to the keyboard 43 so as to acquire the identification code of the keyboard 43. According to the identification code, the USB connecting device 41 realizes that the device type of the keyboard 43 is a keyboard.

In addition, the USB connecting device 41 further transmits the first pairing signal to the keyboard 43 so as to realize that the keyboard 43 is connected with two input devices. Then, the USB connecting device 41 further transmits a second pairing signal to the mouse 44 and the game controller 45 through the keyboard 43 so as to confirm the identification codes of the mouse 44 and the game controller 45. Consequently, the USB connecting device 41 realizes that the device types of the mouse 44 and the game controller 45 are a mouse and a game controller, respectively.

Then, the USB connecting device 41 periodically transmits a first inquiring signal to the keyboard 43, and periodically transmits plural second inquiring signals to the mouse 44 and the game controller 45 through the keyboard 43. It is noted that the first inquiring signal must contain the identification code of the keyboard 43 and the plural second inquiring signals must contain the identification codes of the mouse 44 and the game controller 45. Consequently, the first inquiring signal and the plural second inquiring signals can be received by the keyboard 43, the mouse 44 and the game controller 45.

After the first inquiring signal is received by the keyboard 43, if the user operates the keyboard 43 to input a character, an input signal containing a message about the user-inputted character is transmitted from the keyboard 43 to the USB connecting device 41. Since the device type of the keyboard 43 has been realized by the USB connecting device 41, the USB connecting device 41 will convert the input signal into a control signal containing a message about the input of the specified character, and the USB connecting device 41 will transmit the control signal to the electronic device.

Similarly, after the second inquiring signal is received by the mouse 44, if the user moves the mouse 44, an input signal containing a message about the moving direction and distance is transmitted from the mouse 44 to the USB connecting device 41. According to the device type of the mouse 44, the USB connecting device 41 will convert the input signal into a control signal containing a message about the cursor movement in a specified direction for a specified distance, and the USB connecting device 41 will transmit the control signal to the electronic device.

Similarly, after the second inquiring signal is received by the game controller 45, if the user presses a button of the game controller 45, an input signal containing a message about a recognition code of the button is transmitted from the game controller 45 to the USB connecting device 41. According to the device type of the game controller 45, the USB connecting device 41 will convert the input signal into a control signal containing a message about the function of executing the button, and the USB connecting device 41 will transmit the control signal to the electronic device.

From the above descriptions, the present invention provides an input system. The input system includes a communication device and a first input device. The communication device is externally connectable with the first input device. The first input device is externally connectable with a second input device. The present invention also provides an input method for the input system. A communication chip can be replaced according to the practical requirements. Consequently, the method of connecting the input system with an electronic device is changed. Moreover, by the input system and the input method of the present invention, the first input device or the second input device can be replaced with a different device type. Consequently, the drawbacks of the conventional input system (e.g., the additional cost and the carrying and storing difficulty) will be overcome.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An input system, comprising:
   a communication device in communication with an electronic device, wherein the communication device comprises a communication chip and a communication port; and
   a first input device generating a first input signal, wherein the first input device comprises a signal port and at least one device connecting port, wherein the signal port is connectable with the communication port, and the at least one device connecting port is connectable with at least one second input device, wherein the second input device generates a second input signal,
   wherein when the signal port is connected with the communication port, the communication device transmits a first pairing signal to the first input device so as to acquire a first identification code of the first input device and a connection information of the first input device,
   wherein after the communication device transmits a first inquiring signal containing the first identification code to the first input device, the communication device acquires the first input signal from the first input device, wherein the communication device judges whether a second pairing signal has to be transmitted to the second input device according to the connection information, wherein if the second pairing signal is transmitted to the second input device, the communication device acquires a second identification code of the second input device.

2. The input system according to claim 1, wherein after the communication device transmits a second inquiring signal containing the second identification code to the second input device, the communication device acquires the second input signal from the second input device.

3. The input system according to claim 2, wherein the first inquiring signal and the second inquiring signal are transmitted from the communication device to the second input device through the first input device.

4. The input system according to claim 1, wherein the communication device further comprises a storage unit, wherein the first identification code, the second identification code, a first device type information corresponding to the first identification code and a second device type information corresponding to the second identification code are stored in the storage unit.

5. The input system according to claim 4, wherein the communication device converts the first input signal into a first control signal according to the first device type information and converts the second input signal into a second control signal according to the second device type information, and the communication device transmits the first control signal and the second control signal to the electronic device.

6. The input system according to claim 1, wherein the connection information contains a number of the at least one second input device that is connected with the first input device.

7. The input system according to claim 1, wherein the communication device transmits the first pairing signal to request the first input device to provide the first identification code, and the communication device transmits the second pairing signal to inquire whether the second input device complies with the second identification code.

8. The input system according to claim 1, wherein the communication chip is a wired communication chip or a wireless communication chip.

9. The input system according to claim 1, wherein the communication port, the signal port and the device connecting port comply with I2C (Inter-Integrated Circuit) or SPI (Serial Peripheral Interface Bus) interface standards.

10. The input system according to claim 1, wherein each of the first input device and the second input device is a keyboard, a touchpad, a mouse or a game controller.

11. An input method, comprising steps of:
allowing a communication device to transmit a first pairing signal to a first input device so as to acquire a first identification code of the first input device and a connection information of the first input device; and
the communication device judging whether the first input device is connected with at least one second input device according to the connection message, wherein if the first input device is connected with the corresponding second input device, the communication device transmits a second pairing signal to the corresponding second input device to acquire a second identification code of the corresponding second input device, wherein if the first input device is not connected with the at least one second input device, the communication device transmits a first inquiring signal containing the first identification code to the first input device so as to acquire a first input signal of the first input device.

12. The input method according to claim 11, wherein the communication device acquires a first device type information of the first input device according to the first identification code.

13. The input method according to claim 12, wherein the communication device converts the first input signal into a first control signal according to the first device type information, and the communication device transmits the control signal to the electronic device.

14. The input method according to claim 11, wherein the communication device acquires a first device type information of the first input device according to the first identification code, and the communication device acquires a second device type information of the second input device according to the second identification code.

15. The input method according to claim 14, wherein after the communication device transmits the first inquiring signal to the first input device and transmits a second inquiring signal containing the second identification code to the second input device, the communication device acquires the first input signal from the first input device and acquires a second input signal from the second input device.

16. The input method according to claim 15, wherein the communication device converts the first input signal into a first control signal according to the first device type information and converts the second input signal into a second control signal according to the second device type information, and the communication device transmits the first control signal and the second control signal to the electronic device.

17. The input method according to claim 11, wherein the connection information contains a number of the at least one second input device that is connected with the first input device.

18. The input method according to claim 11, wherein the communication device transmits the first pairing signal to request the first input device to provide the first identification code, and the communication device transmits the second pairing signal to inquire whether the second input device complies with the second identification code.

* * * * *